US008671982B2

(12) United States Patent
Stoermer (10) Patent No.: US 8,671,982 B2
(45) Date of Patent: Mar. 18, 2014

(54) ROTARY SLIDE VALVE, IN PARTICULAR FOR A COOLANT CIRCUIT, WHICH HAS A PLURALITY OF BRANCHES, OF AN INTERNAL COMBUSTION ENGINE; ELECTROMECHANICAL ASSEMBLY

(75) Inventor: Markus Stoermer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 885 days.

(21) Appl. No.: 12/447,387

(22) PCT Filed: Oct. 26, 2007

(86) PCT No.: PCT/EP2007/009287
§ 371 (c)(1),
(2), (4) Date: Feb. 23, 2010

(87) PCT Pub. No.: WO2008/049624
PCT Pub. Date: May 2, 2008

(65) Prior Publication Data
US 2010/0282190 A1  Nov. 11, 2010

(30) Foreign Application Priority Data

Oct. 27, 2006 (DE) .......................... 10 2006 050 826
Feb. 22, 2007 (DE) .......................... 10 2007 008 553
Apr. 23, 2007 (DE) .......................... 10 2007 019 064

(51) Int. Cl.
*F16K 11/078* (2006.01)

(52) U.S. Cl.
USPC ............ 137/625.17; 137/625.42; 137/625.47; 251/248; 251/315.01; 123/41.1

(58) Field of Classification Search
USPC .................. 137/595, 625.17, 625.42, 625.47; 251/248–250.5, 315.01; 123/41.1
See application file for complete search history.

(56) References Cited

U.S. PATENT DOCUMENTS

| | | | | |
|---|---|---|---|---|
| 2,028,181 A | * | 1/1936 | Bard | 137/246.19 |
| 2,399,460 A | * | 4/1946 | Britton | 137/555 |
| 3,152,615 A | * | 10/1964 | Olson | 137/627 |
| 3,266,769 A | | 12/1967 | Shand | |
| 4,655,252 A | | 4/1987 | Krumhansl | |
| 5,167,254 A | * | 12/1992 | Walter et al. | 137/595 |
| 5,215,121 A | * | 6/1993 | Michl | 137/614.2 |
| 6,240,941 B1 | | 6/2001 | Small et al. | |
| 6,308,739 B1 | | 10/2001 | Barbuto et al. | |
| 6,920,845 B2 | * | 7/2005 | Lelkes et al. | 123/41.01 |

(Continued)

FOREIGN PATENT DOCUMENTS

| | | |
|---|---|---|
| CH | 328844 | 3/1958 |
| DE | 28485 | 10/1883 |

(Continued)

*Primary Examiner* — John K Fristoe, Jr.
*Assistant Examiner* — Jessica Cahill
(74) *Attorney, Agent, or Firm* — Novak Druce Connolly Bove + Quigg LLP (57) ABSTRACT

A valve assembly for the coolant system of an internal combustion engine including a housing, at least two coaxially disposed rotary valves journaled in such housing, each of such valves having an axially disposed fluid passageway communicable with an inlet port of such housing and at least one passageway communicating with the axially disposed passageway and communicable with an outlet port of the housing upon a particular orientation of such valve, and a drive gear operatively connected to such valves, operative to rotate such valves to different degrees.

11 Claims, 5 Drawing Sheets

(56) References Cited

U.S. PATENT DOCUMENTS

| | | | |
|---|---|---|---|
| 6,983,764 B2 * | 1/2006 | Arrowood et al. | 137/636.1 |
| 7,131,460 B2 * | 11/2006 | McLane et al. | 137/625.47 |
| 7,163,194 B2 * | 1/2007 | Pervaiz | 251/288 |
| 7,267,084 B2 * | 9/2007 | Lutze et al. | 123/41.02 |
| 2004/0140445 A1 | 7/2004 | Pervaiz et al. | |

FOREIGN PATENT DOCUMENTS

| | | |
|---|---|---|
| DE | 82415 | 7/1895 |
| DE | 912395 | 5/1954 |
| DE | 1024387 A1 | 2/1958 |
| DE | 1425699 | 11/1968 |
| DE | 4009218 A1 | 9/1991 |
| DE | 4203326 A1 | 1/1993 |
| DE | 4410886 A1 | 10/1995 |
| DE | 10024714 A1 | 2/2001 |
| DE | 19957145 A1 | 6/2001 |
| DE | 10000299 A1 | 7/2001 |
| DE | 10053157 A1 | 5/2002 |
| DE | 10159963 A1 | 6/2003 |
| DE | 10218176 A1 | 11/2003 |
| DE | 10222758 A1 | 12/2003 |
| DE | 10253469 A1 | 5/2004 |
| DE | 10321880 A1 | 12/2004 |
| DE | 10329024 A1 | 1/2005 |
| FR | 117402 A | 3/1959 |
| FR | 2803834 A1 | 7/2001 |

* cited by examiner

ROTARY SLIDE VALVE, IN PARTICULAR FOR A COOLANT CIRCUIT, WHICH HAS A PLURALITY OF BRANCHES, OF AN INTERNAL COMBUSTION ENGINE; ELECTROMECHANICAL ASSEMBLY

The invention relates to a rotary slide valve for the coolant circuit of an internal combustion engine, which circuit has a plurality of branches with a plurality of cross section adjustment members.

Furthermore, the invention relates to a rotary slide valve with at least one pivoted cross section adjustment member and a base member which adjoins the cross section adjustment member with the interposition of at least one seal.

Furthermore, the invention relates to a rotary slide valve with at least one cross sectional adjustment member which is pivoted in a base member.

Finally, the invention relates to an electromechanical assembly.

BACKGROUND OF THE INVENTION

The prior art discloses rotary slide valves which, using a plurality of cross section adjustment members, set different flow cross sections for different flow rates, the cross section adjustment members either being connected tightly to one another so that they each execute the same rotary motion and thereby set one or more flow cross sections, or are driven and controlled by one actuator at a time. Rotary slide valves for setting a liquid or gaseous volumetric flow, in particular in the jacket surface of each cross section adjustment member have at least one flow opening which, depending on the angular position of rotation of the cross section adjustment member, can interact with a feed and/or discharge for the medium which is formed on the housing of the rotary slide valve. Depending on the angular position of rotation a flow cross section is set by intersection of the respective flow openings with the feed or discharge. Due to the rotationally fixed connection of the cross section adjustment members, the different flow cross sections cannot be set independently of one another. The use of several actuators is indeed simple, but this solution requires a larger installation space and is more costly.

In order to prevent unintentional outflow of the flow medium, interposing a seal between the cross section adjustment member and the base member is known. Conventionally, it is an elastically deformable sealing element. The sealing element always fits tightly against the cross section adjustment member and the base member when the cross section adjustment member moves rotationally. Uniform contact forces of the seal against the cross section adjustment member, however, can only be set with difficulty based on the shape of the rotary slide valve. Moreover, problems arise in crossing of the cross section adjustment member flow cross section by the sealing member since it can be damaged when crossing by sticking and eversion.

Furthermore, rotary slide valves are known in which at least one cross section adjustment member is pivoted in a base member. Generally, a slide bearing is formed by the jacket surface of the cross section adjustment member and the inner surface of the base member. In this way the cross section adjustment member is guided or supported at least radially in the base member. Due to the slide bearing arrangement, local friction occurs, but this can be kept low by a correspondingly favorable material pairing. In this case, however, there is the disadvantage that a solid or a particle of dirt which is present in the coolant circuit can stick between the cross section adjustment member and the base member. The result would be failure of the rotary slide valve. Conventionally, this is prevented by the gap of the slide bearing arrangement being chosen to be sufficiently small such that as much as possible no solids end up between the cross section adjustment member and the base member. But this leads to increased fabrication expenses and higher production costs. Alternatively, it is known that the gap can be chosen to be sufficiently large such that the solid/solids is/are conveyed through the rotary slide valve between the cross section adjustment member and the base member. But here the cross section adjustment member may become tilted and thus jammed in the base member.

Therefore, the object of the invention is to devise a rotary slide valve with a plurality of cross section adjustment members which allows clearance of an individual flow cross section and circumvents the aforementioned disadvantages.

Another object of the invention is to devise a rotary slide valve with at least one cross section adjustment member and one base member which easily circumvents the aforementioned disadvantages and ensures permanent and reliable sealing.

Another object of the invention is to devise a rotary slide valve with at least one cross section adjustment member which is pivoted in the base member and which easily and inexpensively prevents sticking of the cross section adjustment member in the base member.

SUMMARY OF THE INVENTION

The object of the invention is achieved by at least one means which couples the cross section adjustment members to one another and which produces a rotational angle difference between the cross section adjustment members. The rotary slide valve according to the invention therefore has a means which couples the cross section adjustment members to one another so that, for example, the motion of onecross section adjustment member is transferred to the next cross section adjustment member, the means being made such that it produces a rotational angle difference between the cross section adjustment members. Coupling the two cross section adjustment members to the means which produces the rotational angle difference results, for example, in that one revolution of one cross section adjustment member is not transferred 1:1 to the cross section adjustment member coupled to it. This affords the advantage that the angular positions of rotation of the different cross section adjustment members are not directly dependent on one another, but individual adjustment of the cross section adjustment members and thus of the flow cross sections is possible.

According to one development of the invention the means is a rotary driving gear.

Furthermore, it is provided that the cross section adjustment members are assigned to different rotary elements which are each dynamically connected to one another by way of a rotary driving gear. The rotary driving gear advantageously enables the rotary elements to move with different speeds, only one being driven. In this way the advantage is gained that the rotary positions of the cross section adjustment members are not directly dependent on one another, but allow an individual setting.

Advantageously, the rotary driving gear is made as a step-down gear. This means that an initially driven rotary element executes more revolutions per unit of time than a second rotary element which is dynamically connected to it by way of the rotary driving gear, or the step-down gear. In the step-down gear one rotary element, compared to a step-up gear, must be turned farther and more quickly, however, lower torque is necessary so that the expenditure of force for driving is comparatively low. The step-down gear can have any transmission ratio (speed reduction).

Advantageously, the rotary driving gear has a rotational speed reduction of 2:1 so that of two rotary elements, one, the driver element, turns twice as far as the other. If, for example, one turns 360°, the other turns only by 180°, so that one is returned again to its initial position and the other is in the new position. The cross section adjustment members which are assigned to the respective rotary elements clear at least one flow cross section at a time for gaseous and/or liquid substances, depending on the rotary position of the respective rotary element. Advantageously, the motion of the cross section adjustment member corresponds with the motion of the respective rotary element. Each cross section adjustment member has, for example, one cylindrical body with a flow opening which in a certain rotary position of the rotary element or of the cross section adjustment member corresponds with the appropriate flow opening of another component, such as, for example, the line of a coolant system, such that the flow openings lie directly on top of one another and a maximum flow cross section is cleared. Turning the rotary element (likewise) moves the cross section adjustment member so that the intersection region of the two flow openings and thus the flow cross section are reduced. In a rotary slide valve with two cross section adjustment members and two corresponding rotary elements which are dynamically connected by way of a rotary driving gear or a step-down gear with a transmission ratio of 2:1 (=speed reduction), the two cross section adjustment members each having one flow opening, for example, for two different coolant circuits, the following can now be set: In the initial position there are flow openings each in a position such that the maximum flow cross section is cleared at a time. By turning one rotary element by 180°, the pertinent flow cross section is closed by the corresponding cross section adjustment member, while the other rotary element is turned only by 90° as a result of speed reduction, depending on the configuration of the flow openings there still being one flow cross section. To close this completely, one rotary element must be turned by 360° so that the pertinent cross section adjustment member again assumes the same position, the setting of one rotary element therefore is not changed, and the cross section adjustment member which belongs to the other rotary element is turned by 180° so that the pertinent flow cross section is closed. Thus individually the respective flow cross section can be cleared or closed or set. Of course, as already stated, any other transmission ratios, such as, for example 4:1 or 6:1, are conceivable.

Alternatively, the rotary driving gear is advantageously made as a step-up gear, for example, with a speed increase of 1:2, 1:4 or 1:6. Theoretically, any conceivable transmission ratio (speed increase) is possible.

According to one development of the invention, there are two or three rotary elements so that two or three different flow cross sections can be cleared, as a result of which two or three flows, for example, of different cooling circuits, can be set.

Advantageously, the cross section adjustment member of a first rotary element is the thermostat of a motor vehicle which, depending on the rotary position, clears a small or a large coolant circuit of an internal combustion engine. In this connection, a large coolant circuit is defined as a coolant circuit which leads through the radiator and the internal combustion engine, and a small coolant circuit is defined as a coolant circuit which leads only through the internal combustion engine. During the warm-up phase of the internal combustion engine, only the small coolant circuit can be advantageously cleared by the corresponding setting of the cross section adjustment members so that the coolant located in the internal combustion engine heats up more quickly. A corresponding setting of the cross section adjustment member of the first rotary element in this way makes it possible to proportion the volumetric flow which originates from the coolant circuit and which leads through the radiator so that especially advantageous temperature control can be implemented.

According to one development of the invention, a cross section adjustment member of a second rotary element is made as a heating heat exchanger controller. By turning the second rotary element the heating heat exchanger controller can be set such that the feed of the coolant circuit for the heating heat exchanger is cleared or closed. In this way, the coolant circuit which leads through the heating heat exchanger can be turned on or off.

According to one development of the invention, a cross section adjustment member of a third rotary element is made as an oil cooler controller. By means of the latter the coolant circuit of the oil cooler of the motor vehicle or the internal combustion engine can be cleared or closed. As a result of the step-down gears between the three rotary elements, the relevant components of the cooling system of the motor vehicle, specifically the heating heat exchanger, the small or the large coolant circuit of the internal combustion engine and/or the oil cooler can be controlled independently of one another, the thermostat being infinitely adjustable and the heating heat exchanger controller and the oil cooler controller being made such that they can be completely cleared and/or closed without changing anything on the setting of the thermostat, or, in other words, the setting of the thermostat can be advantageously changed while the heating heat exchanger controller and the oil cooler controller either completely clear and/or close the corresponding flow cross section. When the thermostat, that is to say, the cross section adjustment member of the first rotary element, in an angular range of rotation of 90° sets a corresponding flow cross section, the cross section adjustment member of the second rotary element, that is to say, the heating heat exchanger controller, must be designed such that it can be turned by a rotation angle of 45° and over this angular range completely clears or closes the flow cross section. The same applies analogously to the design of the cross section adjustment member of the third rotary element or of the oil cooler controller.

The cross section adjustment members of the rotary slide valve are advantageously connected to one another fluidally so that the different coolant circuits can be advantageously tied into a common coolant circuit.

Advantageously, the first rotary element can be driven by means of an actuating motor, and the motor actuator as a result of the step-down gear can be small and compact; this yields advantages in installation space and costs. One motor actuator is sufficient here to set all cross section adjustment members individually. The motor actuator and the rotary slide valve together form an electromechanical assembly.

One development of the invention calls for the rotary driving gear to be made as a planetary, spur, or bevel gear transmission. Advantageously, the cross section adjustment members are made such that in one position all flow cross sections are closed so that the volumetric flow of the coolant stops. In this way a switchable or controllable water pump can be omitted.

Advantageously, the cross section adjustment members are made in one piece with the rotary elements, in this way an especially simple execution of the rotary slide valve can be implemented which is on the one hand space-saving and on the other keeps installation and production costs low.

According to one development of the invention, the rotary slide valve has at least one driving cross section adjustment member and at least one cross section adjustment member which can be driven by the driving cross section adjustment member by way of a means made as a driving gear, the driving gear having at least one gear wheel which interacts with driver elements of each cross section adjustment member. In this connection a rotational angle difference is produced by means of the driving gear.

It is advantageously provided that the driver elements of the drivable cross section adjustment member are arranged distributed over its entire periphery and the driver elements of the driving cross section adjustment member are arranged distributed only over at least one peripheral angular range thereof. It is therefore provided that the drivable cross section adjustment member, distributed over the entire periphery, has driver elements so that the motion of the cross section adjustment member is always directly coupled to the motion of the gear wheel, or that the drivable cross section adjustment member can be adjusted only depending on the motion or the rotation of the gear wheel. The driving cross section adjustment member conversely has driver elements arranged distributed only over at least one peripheral angular range. In other words, the driving cross section adjustment member has at least one peripheral angular range which is free of driver elements. This in turn means that the driving cross section adjustment member has ranges of angular positions of rotation in which it does not interact with the gear wheel. In this way, the driving cross section adjustment member can be turned in or over the driver element-free peripheral angular range without the rotary motion being transferred to the gear wheel or the driving cross section adjustment member. Around the driver element-free peripheral angular range of the driving cross section adjustment member it can therefore be moved, set, or turned, released from the drivable cross section adjustment member, the free angle of rotation being mechanically determined by the driver elements, in particular by the number of driver elements. To set the drivable cross section adjustment member, the driving cross section adjustment member is turned such that its driver elements interact with the gear wheel so that the gear wheel and the drivable cross section adjustment member can be turned, the drivable cross section adjustment member per revolution of the driving cross section adjustment member being adjusted accordingly around the peripheral angular range of the driving cross section adjustment member, which range has the driver elements. Advantageously, the driver elements of the driving and of the drivable cross section adjustment member viewed in the peripheral direction have the same distance to one another.

Advantageously, the driver elements are located on the opposite ends of the cross section adjustment members. The cross section adjustment member advantageously have a circular cylindrical cross section and the medium can flow through them axially at least in sections. The cross section adjustment members here are aligned coaxially to one another, the two ends of the cross section adjustment members being opposite one another. The arrangements of the driver elements specifically on these ends enables the driving gear in an especially small space since the gear wheel can interact easily with the two cross section adjustment members.

In one development of the invention, the driver elements of the cross section adjustment members are made as radial driver projections on one jacket surface of the respective cross section adjustment member. In one preferred embodiment of the invention the driver elements are made as axial driver projections, in particular on one face surface of the respective cross section adjustment member, and the driver elements can be made such that they are located between the cross section adjustment members, or inside or outside the jacket surface of the cross section adjustment members. If the driver elements, whether as axial and/or radial driver projections, are located inside or outside the jacket surface of the cross section adjustment members, the cross section adjustment members preferably each have a plane face surface which adjoins the plane face surface of the adjacent cross section adjustment member and thus forms a seal. In addition, in this case, there can also be another sealing member, such as, for example, an O-ring, between the cross section adjustment members. Advantageously, in this case the driver elements of the cross section adjustment members and the plane face surfaces are located on different radii.

Advantageously, the axis of rotation of the gear wheel runs parallel to the axes of rotation of the cross section adjustment members. In this way, on the one hand a narrow design is ensured and, on the other, the rotary motion of the driving cross section adjustment member is transferred directly, that is to say, without reversing the direction of rotation, as a result of which fewer relative motions between the cross section adjustment members occur; this is especially advantageous in a seal as provided above.

According to one development of the invention, the driving gear has an anti-rotation element. Since the driving cross section adjustment member or the driver elements of the driving cross section adjustment member are not connected to the gear wheel in the peripheral angular range which is free of driver elements, and thus the drivable cross section adjustment member can be turned freely, released from the driving cross section adjustment member, it could happen that the drivable cross section adjustment member is unintentionally adjusted. The anti-rotation element of the driving gear prevents this adjustment or turning of the drivable cross section adjustment member when the teeth of the gear wheel are located in the driver element-free peripheral angular range of the driving cross section adjustment member.

Especially preferably, the anti-rotation element is formed by the gear wheel and the driving cross section adjustment member so that additional elements are unnecessary. The anti-rotation element here acts directly on the gear wheel and by way of the gear wheel on the drivable cross section adjustment member. This ensures an especially simple and economical anti-rotation element.

The driving cross section adjustment member advantageously in at least one peripheral angular range which is free of driver elements has a ring segment-shaped locking axial projection which lies advantageously on the same radius as the driver elements. The ring segment-shaped locking axial projection is preferably directly connected to the first and/or the last driver element, or to the outermost driver element(s) of the peripheral angular range of the cross section adjustment member, which range has driver elements.

Advantageously, it is furthermore provided that the driver axial projections project axially farther than the locking axial projection. That is to say that in the driver element-free peripheral angular range the locking axial projection lies axially set back to the driver axial projections, the locking axial projection being provided only in the peripheral angular range which is free of driver elements so that in the peripheral angular range which has driver elements, respectively deep axial recesses are formed between the driver elements or drive axial projections.

Preferably, some of the teeth of the gear wheel are made axially shortened on the side of the gear wheel which interacts with the driving cross section adjustment member. On the side facing the drivable cross section adjustment member all the teeth end axially flush with an imaginary plane which is aligned perpendicular to the axis of rotation so that between the driver axial projections of the drivable cross section adjustment member and the gear wheel there is always essentially the same touching contact.

On the side interacting with the driving cross section adjustment member, advantageously, the wider teeth in certain rotary positions interact with the locking axial projection. In particular, the wider teeth then interact with the locking axial projection when the gear wheel is located in the driver element-free peripheral angular range of the driving cross section adjustment member. In order to effect an anti-rotation element, the flanks of two of the wider teeth rest on the outer jacket surface of the locking axial projection. In another rotary position of the cross section adjustment members the gear wheel can also rest with one of the wider teeth on the jacket surface of the outermost driver axial projection and with another wider tooth on the jacket surface of the locking axial projection.

The narrower teeth, however, are advantageously made or arranged axially spaced to the locking axial projection. In this way the narrower teeth of the gear wheel when turning into one anti-rotation element position can move or turn past the locking axial projection. In one anti-rotation element position, for example, two wider teeth rest on the outer jacket surface of the locking axial projection, one or more narrow teeth of the gear wheel, which are located in between, projecting past the locking axial projection.

According to one development of the invention, the driving gear is located outside the flow cross section of the cross section adjustment members. In this way continuous operation is ensured since at this point disruptive elements entrained by the medium, such as, for example, dirt particles, cannot travel into the driving gear and settle there; this would lead to failure or jamming of the gearing and thus of the entire rotary slide valve. In this connection, especially the above described version of the rotary slide valve is advantageous in which the cross section adjustment members have plane face surfaces which form a seal and which are located on a radius smaller relative to the driver elements in order to prevent penetration of the medium into the driving gear or flow of the medium around the driving gear. Moreover, the driving gear can be easily encapsulated by an advantageous arrangement.

Advantageously, the driving gear has a transmission ratio of 1:1, the rotational angle difference between the cross section adjustment members being determined solely by the size of the peripheral angular range of the driving cross section adjustment member, which range has the driver elements. In this way an especially simple design is offered. Alternatively, the driving gear can be made as a step-up or step-down gear so that rotary motion of the driving cross section adjustment member is transmitted in a specific transmission ratio i ($i \neq 1$). In this way still various other settings of the rotary slide valve can be achieved.

The other object of the invention is achieved by the seal having a seal wall and a sealing lip adjacent to it, the seal wall being made stiffer than the sealing lip. It is therefore provided that the seal has a sealing lip and a seal wall which is made stiffer than the sealing lip. Preferably, the seal is attached to the base member such that it surrounds/encloses a flow cross section or a flow opening of the base member around the entire periphery, the seal wall advantageously likewise adjoining the cross section adjustment member and achieving a sealing action. In this way, a double seal is thus implemented, the more stiffly made seal wall acting, for example, as a coarse seal and the less stiffly made sealing lip acting as a fine seal. The seal wall here protects the sealing lip, for example, against dirt. When crossing the cross section adjustment member-flow cross section, the sealing lip, as is known from the prior art, is elastically deformed, but the deformation or deflection of the sealing lip is limited by the seal wall so that the sealing lip cannot be exposed to high loads, cannot be jammed and/or cannot be everted.

Advantageously, the seal wall compared to the sealing lip consists of a stiffer or less elastic material. It is therefore provided that the seal wall and the sealing lip due to material properties are assigned different functions, such as coarse sealing/fine sealing. Alternatively or in addition thereto, the stiffness of the seal wall and/or the sealing lip is advantageously influenced by its shape. The seal wall can have, for example, stiffening ribs which increase its stiffness. It is likewise conceivable that the stiffness can be set by the cross sectional shape of the sealing lip and/or seal wall.

According to one development of the invention, the sealing lip is adjoined on both sides by the seal walls. Deformation of the sealing lip is thus limited to either side in order to afford especially advantageous protection against sticking or eversion. When the sealing lip is deformed in one direction or the other, it is advantageously pressed against one seal wall or the other which thus supports the sealing lip and prevents overloading or overstretching and sticking and/or eversion.

Preferably the seal walls are formed by the legs of a U-shaped seal profile, the sealing lip being located especially preferably in the interior of the U-shaped seal profile. The U-shaped seal profile which forms the seal walls and which is made preferably in one piece can be easily handled and easily mounted. The legs are connected to one another by the crosspiece of the U-shaped seal profile. The sealing lip, as already stated, is located preferably within the U-shaped seal profile so that it is surrounded by the two seal walls, that is, on both sides. Advantageously, the sealing lip is located on the crosspiece of the U-shaped seal profile and is attached to it. The sealing lip can be attached to the crosspiece, for example, by vulcanization, cementing, or other connecting methods known to one skilled in the art.

If there is only one seal wall, it is preferably a component of an L-shaped seal profile, one leg forming the seal wall and one leg forming the crosspiece on which the sealing lip, as described above for the U-shaped seal profile, is attached. The L-shaped or U-shaped execution of the seal profile ensures stable and reliable guidance of the sealing lip. According to one development of the invention, a spring element which is located between the seal profile and the base member of the rotary slide valve acts on the seal profile (U-shaped or L-shaped). This results in the seal being pressed against the cross section adjustment member and due to the seal profile, a uniform contact force is ensured or implemented.

In the force-free, that is, unloaded state, the sealing lip preferably has a lateral distance or lateral distances to the seal wall or to the seal walls. In this way a certain latitude of movement is imparted or enabled to the sealing lip to one seal wall or between the two seal walls, in which the sealing lip can deform. If the lateral distance is chosen to be correspondingly large, the sealing lip is prevented from "falling out" of the seal profile.

According to another advantageous embodiment of the invention, the seal wall and/or the seal walls consist of teflon. Preferably, the sealing lip consists of an elastomer material.

At least one seal as was described above is advantageously also provided with a plurality of cross section adjustment members in the above described rotary slide valve. Advantageously, at least one seal which is made according to one of the above described embodiments is interposed between each cross section adjustment member and each base member which interacts with the corresponding cross section adjustment member.

The rotary slide valve according to the invention with at least one cross section adjustment member which is pivoted in the base member is characterized in that the cross section adjustment member is located at least radially spaced to the base member. On the one hand, tilting of the cross section adjustment member is prevented by the arrangement of the cross section adjustment member with a fixed radial distance to the base member, and, on the other hand, the gap between the cross section adjustment member and the base member which corresponds to the distance can be chosen accordingly. In addition to the described radial spacing of the cross section adjustment member to the base member, there can also be axial spacing, for example, between the face surfaces of the cross section adjustment member and of the base member.

Advantageously, the distance is chosen to be sufficiently large so that a solid of a definable size which is assumed to be in the coolant circuit does not stick between the cross section adjustment member and the base member. Therefore the distance between the cross section adjustment member and the base member here is chosen such that especially the largest assumed solid in the coolant circuit cannot stick and/or collect between the cross section adjustment member and the base member. The solid is rather conveyed through the advantageously chosen distance between the cross section adjustment member and the base member.

According to one development of the invention, the cross section adjustment member has at least one shaft section, by means of which the cross section adjustment member is pivoted on the base member. Especially preferably, the cross section adjustment member has two shaft sections which are pivoted on the base member and preferably produce a certain support of the cross section adjustment member in the base member. The shaft section or the shaft sections together with a corresponding segment of the base member form a bearing of the rotary slide valve. Advantageously, the bearing is a slide bearing. Moreover, it is also conceivable to interpose at least one anti-friction bearing between at least one shaft section and the base member.

Advantageously, the shaft section is located on one face side of the cross section adjustment member. Preferably, the two shaft sections are located on one face side of the cross section adjustment member at a time so that the cross section adjustment member is located between the shaft section and is supported on both sides in the base member. The bilateral support continuously prevents tilting of the cross section adjustment member. Advantageously, the shaft section has a smaller diameter than the cross section adjustment member or the jacket surface of the cross section adjustment member.

According to one development of the invention, the rotary slide valve has at least one seal connected between the cross section adjustment member and the base member, in particular a seal as was described above. The described bearing arrangement of the cross section adjustment member in the base member is advantageously provided in the above described rotary slide valve with a plurality of cross section adjustment members which are coupled to one another so that each of the cross section adjustment members is protected against sticking.

The electromechanical assembly is characterized by at least one electric drive which drives the rotary slide valve or a cross section adjustment member. By means of the drive the cross section adjustment member or the cross section adjustment members can be set individually. The electromechanical assembly of the rotary slide valve and the drive forms a compact unit which can be easily integrated into the coolant circuit of an internal combustion engine, in particular of a motor vehicle. The electromechanical assembly can be used for setting or adjusting all thermal management of the internal combustion engine or of the motor vehicle.

DETAILED DESCRIPTION OF THE PREFERRED EMBODIMENTS OF THE INVENTION

Figure 1:
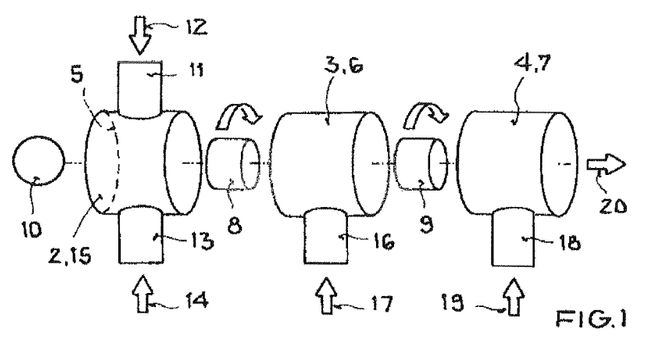
FIG. 1 shows a three-stage rotary slide valve according to the invention in a schematic, FIGS. 2a) to 2d) show the operating principle of the rotary slide valve according to the invention in a schematic.

FIG. 1 shows in a schematic one exemplary embodiment of a three-stage rotary slide valve 1 according to the invention with three cross section adjustment members 2, 3, and 4 which are made respectively in one piece with one of the rotary elements 5, 6, and 7. Each of the two cross section adjustment members 2, 3 and 3, 4 are dynamically connected to one another by way of the rotary driving gear in the form of step-down gears 8 and 9. The first cross section adjustment member 2 is driven by a motor actuator 10. The cross section adjustment member 2 interacts with the feed 11 of the large coolant circuit 12 and with the feed 13 of the small coolant circuit 14, the cross section adjustment member 2 having an opening which is not shown here and which, depending on the rotary position of the cross section adjustment member 2 or of the rotary element 5, corresponds with one of the feeds 11 or 13, so that a flow cross section for one of the two coolant circuits 12, 14 can be cleared or closed or set. The three-stage rotary slide valve 1 shown here constitutes a control unit for thermal management of a motor vehicle. The small coolant circuit 14 is the coolant circuit which leads through the internal combustion engine of the motor vehicle, and the large coolant circuit 12 consists of the small coolant circuit 14 and a coolant circuit which runs in addition through the radiator of the motor vehicle. Using the first cross section adjustment member 2 which in this case constitutes a thermostat 15, it can thus be set which of the coolant circuits 12, 14 is set or activated, as a result of which the coolant temperature can be adjusted. The flow cross section is advantageously infinitely adjustable so that the volumetric flow of the coolant of the respective coolant circuit 12, 14 can be advantageously proportioned.

The second cross section adjustment member 3 interacts with the feed 16 of a heating heat exchanger 17 and likewise has a flow opening which is not shown here and which, depending on the rotary position of the cross section adjustment member 3 or of the rotary element 6, corresponds with the feed 16 such that a flow cross section is cleared. In this way, the coolant circuit of the heating heat exchanger 17 can likewise be tied into the coolant circuit which is set by the cross section adjustment member 2. For this purpose, it is provided that the cross section adjustment members 2 and 3 are dynamically connected to one another fluidally.

The third cross section adjustment member 4 which is advantageously connected to the cross section adjustment member 3 fluidally interacts with the feed 18 of the coolant circuit of an oil cooler 19 and for this purpose has a flow opening which is likewise not shown here and which corresponds with the feed 18 such that depending on the rotary position of the rotary element 7 or of the cross section adjustment member 4 a flow cross section is cleared so that the coolant circuit of the oil cooler 19 can be likewise included in the overall coolant circuit 20. The third cross section adjustment member 4 is advantageously connected to a water pump which is not shown here and which conveys the coolant. As a result of the step-down gears 8 and 9 the different coolant circuits 12, 14, 17, and 19 can be connected to the overall coolant circuit 20 independently of one another, the step-down gears 8 and 9 advantageously implementing a speed reduction of 2:1.

The flow openings of the cross section adjustment members 3 and 4 are advantageously made such that they completely clear or close the respective flow cross section at a certain angle of rotation. If, for example, the first cross section adjustment member 2 is made such that it sets the corresponding flow cross section over a range of 90°, this flow opening of the second cross section adjustment member 3 must be made such that for rotation of 45° of the cross section adjustment member 3 the maximum flow cross section which belongs to the cross section adjustment member 3 remains completely opened or completely closed. The corresponding applies to the cross section adjustment member 3 with consideration of speed reduction.

Figures 2A, 2B:
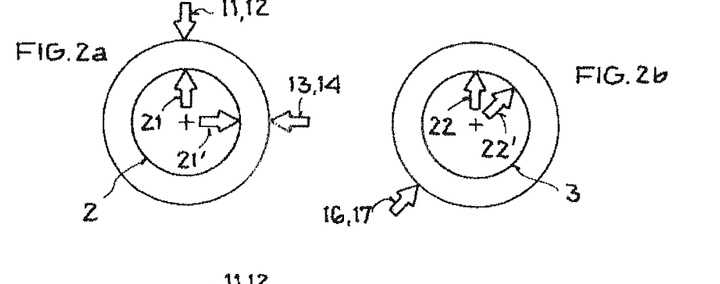

The manner of operation of the rotary slide valve will be detailed using the diagrams shown in FIGS. 2a to 2d. FIG. 2a shows in a schematic cross section the first cross section adjustment member 2 from FIG. 1 with feeds 11 and 13 of the large coolant circuit 12 and of the small coolant circuit 14 which are arranged at an angle of 90° to one another. The arrow 21 here indicates the initial position of the flow opening of the cross section adjustment member 2. In this initial position 21, the flow opening corresponds with the feed 11 of the large coolant circuit so that it is "activated". It should be noted here that the illustrated arrows in FIGS. 2a) to 2d) each show the position of a flow opening or a feed. By turning the cross section adjustment member 2 into position 21', that is, by turning the flow opening of the cross section adjustment member 2 into position 21' by 90°, the initially cleared flow cross section is closed and a new flow cross section is cleared which clears the feed 13 of the small coolant circuit 14. Depending on the configuration of the flow openings and the feeds 11 and 13, the cross section adjustment member 2 must be turned more or less far in order to completely clear or close a flow cross section.

FIG. 2b shows in a schematic cross section the cross section adjustment member 3 which is driven by way of the step-down gear 8 of the cross section adjustment member 2, which gear is not shown here. The initial position of the flow opening of the cross section adjustment member 3 is marked by the arrow 22 and the position of the feed 16 of the coolant circuit of the heating heat exchanger 17 by the arrow 23. The cross section adjustment member 3 is in the initial position when the cross section adjustment member 2 is in the initial position shown in FIG. 2a.

By turning the cross section adjustment member by 90° into position 21' the cross section adjustment member 3 as a result of the step-down gear with a transmission ratio of 2:1 is turned by one half, that is, by 45°, to position 22', for the coolant circuit of the heating heat exchanger 17 a flow cross section not being cleared.

Figures 2C, 2D:
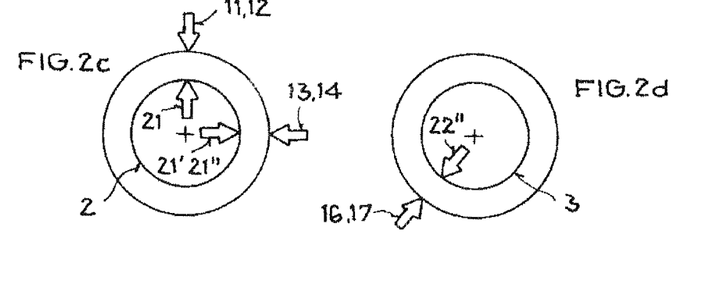

In order to connect the heating heat exchanger 17, the flow opening must be turned from position 22' by 180°. For this reason, the cross section adjustment member 2 or the rotary element 5 based on the speed reduction ratio of 2:1 of the step-down gear 8 must be turned by 360° so that it is in position 21" which is shown in FIG. 2c and which corresponds to position 21' so that nothing has changed in the flow situation on the cross section adjustment member 2, while, as shown in FIG. 2d, the cross section adjustment member 3 has been turned by 180° from position 22' to position 22" so that the flow opening of the cross section adjustment member 3 corresponds with the feed 16 of the heating heat exchanger 17. It is therefore possible here that the flow cross section which has been cleared by the cross section adjustment member 2 does not change and the heating heat exchanger 17 is "activated". Based on the advantageous configuration of the flow opening of the cross section adjustment member 3, at this point the cross section adjustment member 2 can control the volumetric flow by setting the flow cross section without the flow cross section which is cleared by the cross section adjustment member 3 changing. The same principle can be applied to the cross section adjustment members 3 and 4 or the rotary elements 6 and 7 which are dynamically connected to one another by way of the step-down gear 9. Since there is likewise a transmission ratio of 2:1 here, the cross section adjustment member 4 turns only by one fourth of a revolution of the cross section adjustment member 2. If the cross section adjustment member 4 or the rotary element 7 are to be turned, for example, by 180° so that the oil cooler 19 is likewise tied into the overall coolant circuit 20, the cross section adjustment member 2 or the rotary element 5 must be turned by 720°.

It is thus advantageously achieved that the different components of the cooling system of the motor vehicle can be tied into the coolant circuit independently of one another, only one actuator, specifically, the motor actuator 10, needing to be connected. This yields advantages with respect to the amount of space required and the costs. Advantageously, the step-down gears 8 and 9 are made as planetary, spur, or bevel gear transmissions. Because the step-down gears 8, 9 are used, the motor actuator 10 must continue to turn, but a smaller torque is necessary so that the motor actuator 10 can likewise be made advantageously small. The motor actuator 10 and the rotary slide valve 1 here form a compact electromechanical assembly.

Figures 3, 4:
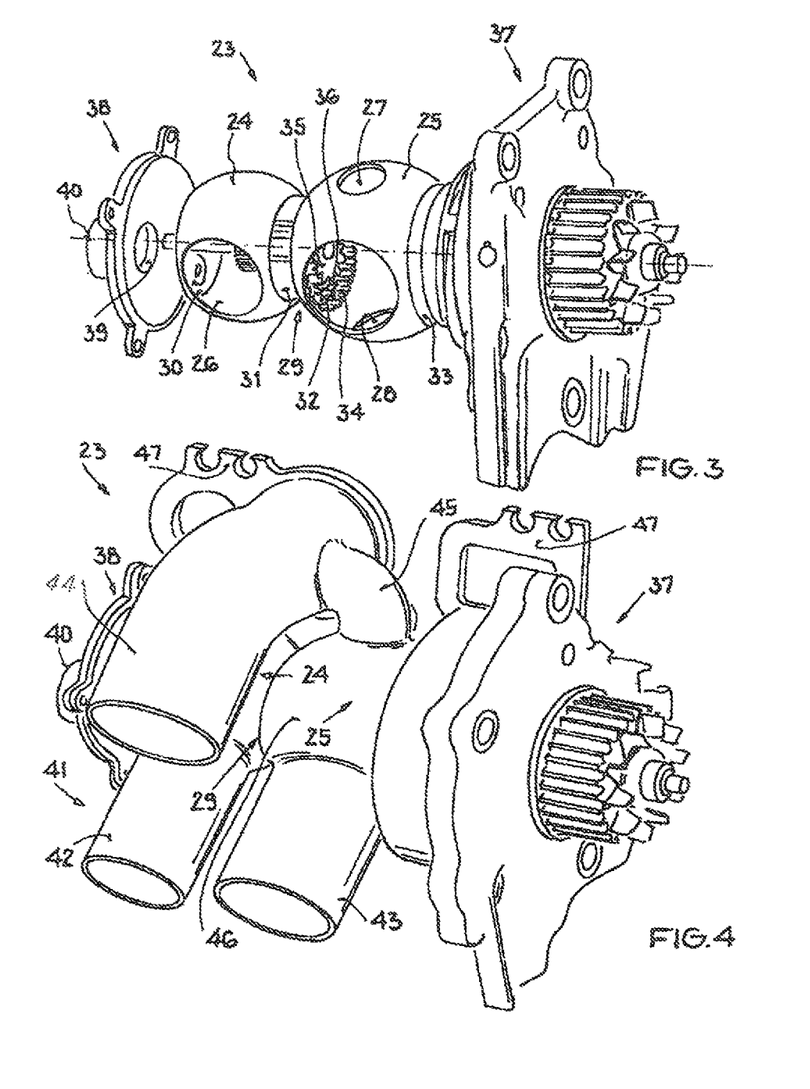
FIG. 3 shows one exemplary embodiment of the three-stage rotary slide valve according to the invention.
FIG. 4 shows the three-stage rotary slide valve with periphery.

FIG. 3 shows in a perspective one embodiment of a three-stage rotary slide valve 23 according to the invention. The three-stage rotary slide valve 23 has two cross section adjustment members 24 and 25 which are made essentially spherical. The cross section adjustment member 24 has a circular flow opening 26 and the cross section adjustment member 25 has a circular flow opening 27 and another circular flow opening 28 which, depending on the rotary position of the cross section adjustment members 24, 25, corresponds with the feeds which are not shown here, as described in the aforementioned example. The cross section adjustment members 24 and 25 are advantageously made as rotary elements and are dynamically connected to one another by means of a planetary gear transmission 29 with a transmission ratio of 2:1. The planetary gear transmission 29 is advantageously at least partially integrated into the cross section adjustment members 24 and 25. The cross section adjustment members 24 and 25 on their face sides each have flow openings 30, 31 and 32 and 33 which are each aligned perpendicular to the axis of rotation in order to tie the cross section adjustment members into a common circuit fluidally. In the flow opening 32 the ring gear 34 of the planetary gear transmission 29 is made, with which the sun wheel 35 interacts by way of planetary gears 36 whose fixed planet member is dynamically connected to the cross section adjustment member 24. The cross section adjustment member 25 is connected to a water pump 37 which provides for the corresponding coolant flow.

The cross section adjustment member 24 is connected axially to a cross section adjustment member 38 in the form of a disk which has a flow opening 39 which corresponds with the feed so that, for example, the coolant of the small coolant circuit of an internal combustion engine can flow in. On the back of the connecting element 38 there is, moreover, a motor actuator 40 which sets the rotary position of the cross section adjustment member 38 and thus, by way of a planetary gear transmission which cannot be recognized in this figure, with a transmission ratio of 2:1, the rotary position of the cross section adjustment member 24, and, by way of the planetary gear transmission 29, the rotary position of the cross section adjustment member 25.

FIG. 4 shows the three-stage rotary slide valve 23 from FIG. 3 in another perspective, a feed system 41 also being illustrated. The feed system 41 has three feed pipes 42, 43, and 44, feed pipes 42 and 43 leading directly to the cross section adjustment members 24 and 25, and from the feed pipe 44 another feed pipe 45 which has a smaller cross section than the feed pipes 42, 43, and 44 likewise leads to the cross section adjustment member 25. The feed pipes 42, 43, and 45 discharge here into a flow housing 46 which surrounds the cross section adjustment members 24, 25, and 38 and part of the water pump 37 and whose shape is matched to the cross section adjustment members 24, 25, and 38 to enhance flow. The feed system 41 has holding elements 47 by means of which the feed system 41 can be attached, for example, to an internal combustion engine housing.

By means of the motor actuator 40 and the planetary gear transmission (29), the cross section adjustment members 24, 25, and 38 can be turned, that at least one can be cleared or closed or set by the flow cross section formed by one of the feed pipes 41, 43, and 45 and one of the flow openings 26, 28, and 27. Setting takes place as described in FIGS. 1 and 2. Specifically, other shapes of the cross section adjustment members 24, 25, and 38 are also conceivable, such as, for example, cylindrical cross section adjustment members 24, 25, and/or 38 within the framework of the rotary slide valve 23 according to the invention. The combination of spherical cross section adjustment members 24 and 25 and the disk-shaped cross section adjustment member 38 shown in FIGS. 3 and 4 leads to an advantageous compact embodiment of the rotary slide valve 23 according to the invention.

Figure 5:
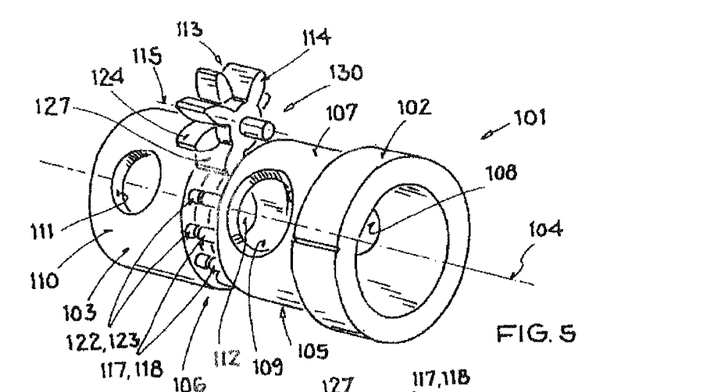
FIG. 5 shows another exemplary embodiment of the rotary slide valve according to the invention, in a perspective.

FIG. 5 shows in a perspective another exemplary embodiment of the rotary slide valve 101 according to the invention. The rotary slide valve 101 has a driving cross section adjustment member 102 and a drivable cross section adjustment member 103 which are made essentially circularly cylindrical and are each arranged to be pivoted around the axis of rotation 104. That is to say, the cross section adjustment members 102, 103 are aligned coaxially to one another. The cross section adjustment members 102 and 103 are located oppositely near one another with their ends 105 and 106. The driving cross section adjustment member 102 in its jacket surface 107 has two flow openings 108 and 109 which are essentially opposite one another and which interact with feeds and/or discharges of the branches of the coolant circuit of the internal combustion engine, which feeds and/or discharges are not shown here. Depending on the rotary position of the cross section adjustment member 102 and the associated intersection of the flow opening 108 and 109 with one of the feeds or discharges, a flow cross section is cleared. The cross section adjustment member 102 is dynamically connected to a motor actuator which is likewise not shown here and which can turn the cross section adjustment member 102 around the axis of rotation 104. The cross section adjustment member 103 in its jacket surface 110 likewise has two flow openings 111, 112 which interact with the corresponding feeds or discharges of one or more branches of the coolant circuit, as described above. A medium, such as, for example, the coolant of the coolant circuit of the internal combustion engine, can, for example, flow into the cross section adjustment members along the axis of rotation 104 and depending on the rotary position of the cross section adjustment members 102 and 103, can be distributed among the corresponding branches of the coolant circuit. The drivable cross section adjustment member 103 can be driven by way of the driving gear 113 of the driving cross section adjustment member 102. The driving gear 113 has a gear wheel 114 which is able to pivot around the axis of rotation 115 which runs parallel to the axis of rotation 104. The gear wheel 114 is located essentially outside of the cross section adjustment members 102 and 103 on the opposing ends 105 and 106. The driving gear in this exemplary embodiment has a transmission ratio of 1:1.

Figures 6, 7:
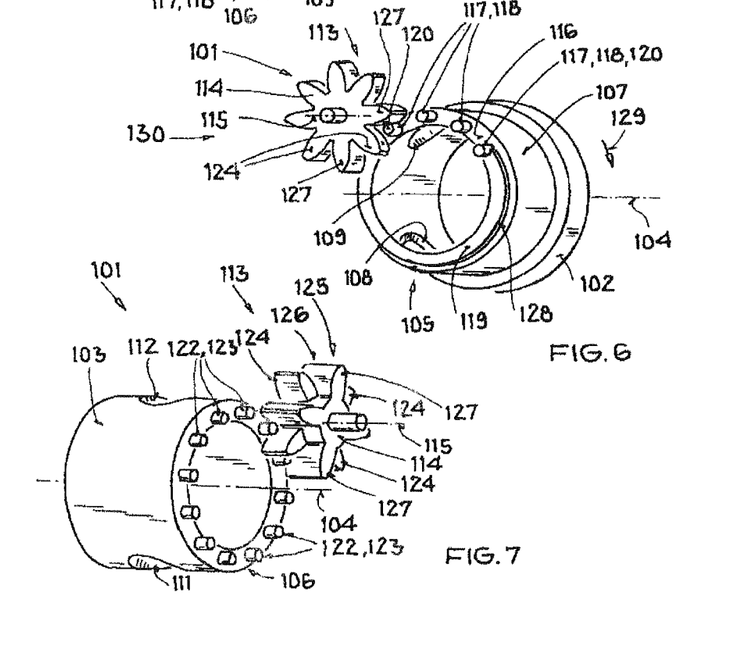
FIG. 6 shows a driving cross section adjustment member of the rotary slide valve.
FIG. 7 shows a drivable cross section adjustment member of the rotary slide valve.

FIG. 6 shows the cross section adjustment member 102 and the gear wheel 114 in a perspective looking at the end 105. The cross section adjustment member 102 on its face surface 116 of its end 105 in a range of peripheral angles has several driver elements 117 which are made as driver axial projections 118. The driver axial projections 118 are shaped essentially as circular cylinders, their axis of rotation being located parallel to the axis of rotation 104. In the other driver element-free peripheral angular range the cross section adjustment member 102 has a ring segment-shaped locking axial projection 119 which is connected directly to the outermost driver axial projections 120 of the driver axial projections 118. The driver axial projections 118 project farther from the face surface 116 of the cross section adjustment member 102 than the locking axial projection 119.

FIG. 7 shows in another perspective, looking at the end 105, the cross section adjustment member 103 and the gear wheel 114. The cross section adjustment member 103 on its end 106 has driver elements 122 which are arranged distributed over the entire periphery, which project axially from the face surface 121, and which are designed as driver axial projections. For reasons of clarity not all driver elements 122/driver axial projections 123 are labeled with reference numbers.

Every other tooth 124 of the gear wheel 114 in this exemplary embodiment of FIGS. 5 to 7 is made axially shortened on the side 125 of the gear wheel 114, which side interacts with the driving cross section adjustment member 102. On the side 126 of the gear wheel 114 which interacts with the cross section adjustment member 103, all the teeth of the gear wheel 114 are made identical so that each tooth can interact with the driver elements 122 or the driver axial projections 123 of the cross section adjustment member 103. The cross section adjustment member 103 is thus always engaged to the gear wheel 114, as a result of which it cannot turn independently of the gear wheel 114.

If the driving cross section adjustment member 102 is turned such that the gear wheel is in the peripheral angular region which has the driver axial projections 118, all teeth of the gear wheel interact with the driver axial projections 118 so that rotary motion or a force can be transferred to the gear wheel 114 and thus also to the cross section adjustment member 103. If the cross section adjustment member 102 is turned out of the peripheral angular range which has the driver axial projections 118, the teeth 124 of the gear wheel 114 which are narrower or which are made shortened, viewed axially, extend past the locking axial projection 119, while the wider or normally made teeth 127 of the gear wheel 114 interact with the locking axial projection 119 as shown in FIG. 6. The turning motion of the cross section adjustment member 102 causes one of the wider teeth 127 to come to rest on the outer jacket surface 128 of the locking axial projection 119 so that the gear wheel 114 cannot continue to turn. In the turning position shown in FIG. 6, one of the wider teeth 127 rests on the jacket surface 128 of the locking axial projection 119 and another wider tooth 127 rests on the outermost driver axial projection 120, the tooth 124 which is made shortened and which lies in between extending axially past the locking axial projection 119. The narrower teeth 124, or those made shortened, are advantageously spaced axially to the locking axial projection 119.

If the cross section adjustment member 102 is turned farther in the direction of the arrow 129, the second wider tooth 127 rests on the jacket surface 128 of the locking axial projection 119, since the jacket surface of the driver axial projection 120 advantageously undergoes transition directly into the jacket surface 128. By an advantageous execution the cross section adjustment member 102 can be further turned in the direction of the arrow 129 without a force being transferred to the gear wheel 114. The locking axial projection 119 and the advantageously made teeth 124, 127 of the gear wheel 114 thus form an anti-rotation element 130 for the gear wheel 114 and the cross section adjustment member 103. Since the gear wheel 114 in each rotary position of the cross section adjustment member 103 engages the cross section adjustment member 103 or the driver elements 122 of the cross section adjustment member, the cross section adjustment member 103 cannot turn when the gear wheel 114 is locked by the anti-rotation element 130.

The advantageous execution of the rotary slide valve 101 shown in FIGS. 5 to 7 makes it possible to individually set/switch the cross section adjustment members 102 and 103 or the flow cross sections which can be set by the cross section adjustment members 102 and 103. The driving cross section adjustment member 102 with one complete revolution effects turning of the cross section adjustment member 103 which corresponds essentially to the peripheral angular range which has the driver elements 117. In order to achieve a complete revolution of the cross section adjustment member 103, the cross section adjustment member 102 need simply be turned several times by 360°. In particular, the number of driver elements 117 determines the angle of rotation of the cross section adjustment member 103. In the driver element-free peripheral angular region of the cross section adjustment member 102, the cross section adjustment member 102 can be turned independently of the cross section adjustment member 103 so that flow cross section can be individually set by means of the flow openings 108 and 109. The anti-rotation element 130 makes it possible for the cross section adjustment member 103 not to be turned or reset by itself or unintentionally when the cross section adjustment member 102 with its driver element 117 does not engage the gear wheel 114. By arranging the driving gear 113 or the gear wheel 114 outside of the cross section adjustment members 102 and 103 or outside the flow cross section of the cross section adjustment members 102 and 103, the driving gear 113 is advantageously protected against dirt particles which are entrained by the medium/coolant flowing through the rotary slide valve 101.

In another advantageous embodiment which is not shown here, there is at least one other cross section adjustment member which adjoins the cross section adjustment member 103 and is dynamically connected to the cross section adjustment member 103 by way of a driving gear which corresponds to the driving gear 113, then the cross section adjustment member 103 being made as a driving cross section adjustment member relative to the further cross section adjustment member and thus being made on its end opposite end 106 as is the case with the end 105 of the cross section adjustment member 102, the peripheral angular range which has driver elements of course being variable to that of the cross section adjustment member 102. Of course, it is also conceivable to make the driving gear 113 as a step-up or step-down gear. Fundamentally, any number of cross section adjustment members as described above can be dynamically connected to one another, a single motor actuator being sufficient for individual setting of the flow cross sections. Alternatively to the driver axial projections 118 or 123 shown here, the driver elements 117, 122 can be made as toothing.

Figure 8:
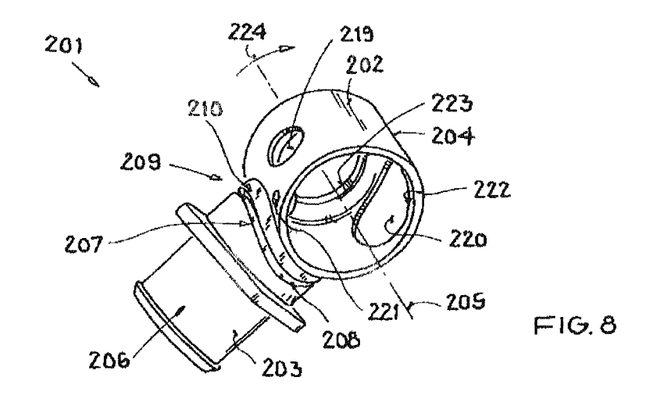
FIG. 8 shows one exemplary embodiment for a rotary slide valve with a seal.
Figure 9:
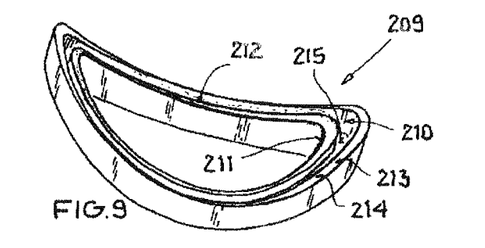
FIG. 9 shows the U-shaped seal profile of the seal.
Figure 10:
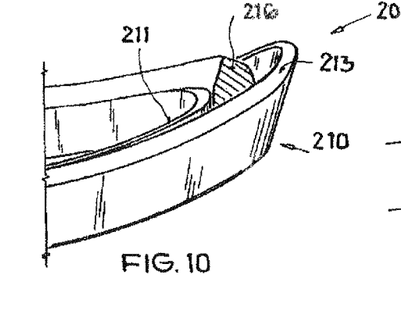
FIG. 10 shows the U-shaped seal profile with a sealing lip.
Figure 11:
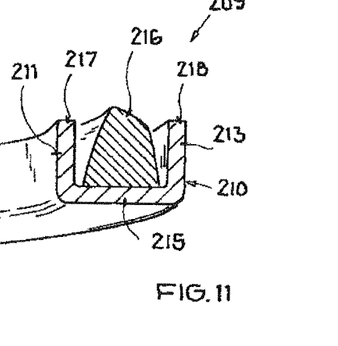
FIG. 11 shows an advantageous seal in cross section.

FIG. 8 shows a rotary slide valve 201 with a pivoted sliding member 202 and a base member 203. The sliding member 202 is made as an essentially cylindrical cross section adjustment member 204 which is pivoted on its axis 205. The base member 203 is formed by an essentially cylindrical pipe socket 206 which is aligned radially to the cross section adjustment member 204. On its end 207 facing the cross section adjustment member 204, the pipe socket 206 or the base member 203 has a shape matched to the cross section adjustment member 204. Between the pipe socket 206 and the cross section adjustment member 204 there are a spring element 208 and a seal 209 arranged such that the seal profile 210 of the seal 209 is pressed against the cross section adjustment member 204 by the action of the spring element 208. The spring element 208 and the seal 209 or seal profile 210 are made annular and surround a flow cross section of the base member 203 which is not shown here. In FIGS. 9 to 11 the elements which are already known from FIG. 8 are provided with the same reference numbers.

FIG. 9 shows the seal profile 210 in a perspective. The seal profile 210 here is made as a teflon, U-shaped seal profile 210 in which one leg 212 which forms the inner seal wall 211 and one leg 214 which forms the outer seal wall 213 are connected in one piece to a crosspiece 215. The U-shaped seal profile 210 of the seal 209 is advantageously made of teflon.

FIG. 10 shows a section of the seal 209 in another perspective, in the U-shaped seal profile 210 an exemplary sealing lip 216 being enclosed. The sealing lip 216 and the U-shaped seal profile 210 form the seal 209. The sealing lip 216 is advantageously produced from an elastomer material. In FIG. 10 it is shown in a sectional view so that its cross section can be discerned. Due to the different materials (elastomer/teflon) the seal walls 211 and 213 are made stiffer than the sealing lip 216. The sealing lip has lateral distances to the seal walls 211 and 213 in the unloaded or force-free state shown here.

FIG. 11 shows a sectional view of the seal 209, in addition to the sealing lip 216, as shown in FIG. 10, the seal profile 210 also being shown in cross section. The lateral spacing of the sealing lip 216 to the seal walls 211 and 213 allows a latitude of movement of the sealing lip 216 in both directions in which the sealing lip 216 can move, shift or be deformed. The free ends 217 and 218 of the seal walls 211 and 213 advantageously in the mounted state of the rotary slide valve 201 likewise fit closely against the cross section adjustment member 204, as is shown in FIG. 8.

The sliding member 202 or the cross section adjustment member 204 has a plurality of cross section adjustment member flow cross sections 219, 220, and 221 made in its jacket surface. On its face ends the cross section adjustment member 204 moreover has openings 222 and 223 for the feed and discharge of the flow medium. To set the flow cross sections, the cross section adjustment member 204 is turned or shifted, for example, in the direction of the arrow 224. The cross section adjustment member flow cross sections 219, 220, and 221 are moved by rotary motion in the direction of the arrow 224 into the intersecting position with the base member flow cross section which is made in the pipe socket 206. A liquid or gaseous medium can flow through the base member flow cross section through the pipe socket 206 or the base member 203. The intersecting cross section here forms the set flow cross section of the rotary slide valve 201. Starting with an angle of rotation of approximately 90°, in this embodiment the seal 209 crosses the opening 219 made in the jacket surface of the cross section adjustment member 204. The advantageous configuration of the seal 209 prevents sticking and/or eversion of the sealing lip 216. Since the seal walls 211 and 213 are made stiffer than the sealing lip 216, the latter, when it is pressed against one of the seal walls 211 or 213 by the rotary motion of the cross section adjustment member 204, is supported by the corresponding seal wall (211 or 213). The advantageous seal 209 easily prevents escape of the medium, sticking and/or eversion of the sealing lip 216. As an alternative to the illustrated pipe socket 206, the base member 203 can also be made as a rotary slide valve housing which has or surrounds the cross section adjustment member 204. The spring element 208 which is advantageously made as a compression spring presses the seal profile 210 and thus also the sealing lip 216 uniformly against the cross section adjustment member 204 so that uniform sealing action is achieved around the periphery.

Alternatively to the choice of material for setting the stiffness of the sealing lip 216 and of the seal profile 210, it is likewise conceivable that the respective stiffness can be influenced by the shape of the sealing lip 216 or of the seal profile 210.

The seal 209 described here is advantageously provided in another embodiment which is not shown here as a seal for at least one of the rotary slide valves described in FIGS. 1 to 7.

Figure 12:
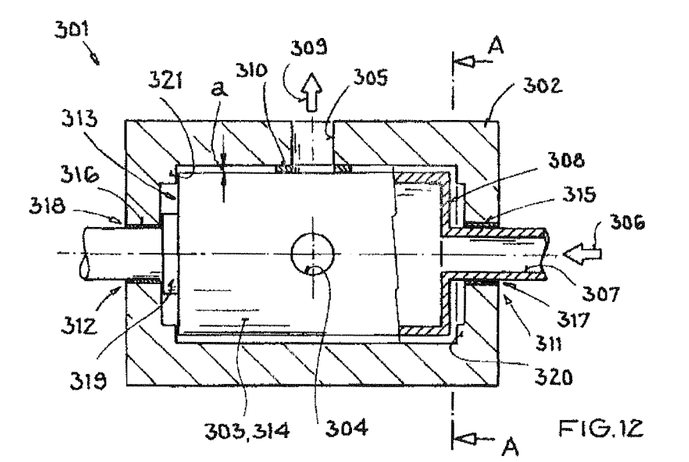
FIG. 12 shows another exemplary embodiment of a rotary slide valve according to the invention in a schematic.

FIG. 12 shows in a schematic cross section another embodiment of the rotary slide valve 301 according to the invention. The rotary slide valve 301 has a base member 302 and a cross section adjustment member 303 which is pivoted in it. The cross section adjustment member 303 like the cross section adjustment members of the previous figures is made hollow and in its jacket surface has a flow opening 304 which forms an intersection region in certain rotation angle positions of the cross section adjustment member 303 with the flow opening 305 of the base member 302. In the rotation angle position of the cross section adjustment member 303 shown here, the cross section adjustment member 303 is, however, in a position in which the flow opening 304 is not in communication with the flow opening 305. In operation of the rotary slide valve 301, for example, a coolant can flow into the cross section adjustment member 303 in the direction of the arrow 306 through the face side 308 of the cross section adjustment member 303 which has an opening 307 and for a corresponding intersection region of the flow openings 304 and 305 can flow out in the direction of the arrow 309. So that coolant does not flow unintentionally out of the rotary slide valve 301, in the region of the flow opening 305 a seal 310 is interposed between the cross section adjustment member 303 and the base member 302. The seal 310 is advantageously made corresponding to the seal 209 from the preceding figures.

The cross section adjustment member 303 furthermore has two shaft sections 311 and 312, the shaft section 311 being located on the face side 308 and the shaft section 312 being located on the face side of the cross section adjustment member 303 which is opposite the face side 308. The shaft sections 311 and 312 have a diameter which is smaller than the diameter of the jacket surface 314 of the cross section adjustment member 303. The base member 302 has two bearing seats 315, 316 which together form a respective slide bearing 317 or 318 with the shaft sections 311 and 312. The cross section adjustment member 303 is thus advantageously pivoted on both sides in the base member 302 by means of the slide bearings 317, 318.

The cross section adjustment member 303 is arranged in the base member 302 such that it is spaced radially to the base member 302. This means that over the periphery of the cross section adjustment member 303 there is a distance a between the jacket surface 314 of the cross section adjustment member 303 and the inside of the base member 302. The distance a is advantageously chosen such that a solid of a definable size which is assumed to be in the coolant circuit cannot stick between the cross section adjustment member 303 and the base member 302. The height of the seal 310 is chosen according to the magnitude of the distance a so that its always sealed against the cross section adjustment member 303 and the base member 302. The bilateral support of the cross section adjustment member 303 ensures that in operation on the one hand the cross section adjustment member 303 cannot stick and tilt and on the other hand the solid cannot stick and/or collect between the cross section adjustment member 303 and the base member 302. The cross section adjustment member 303 is, in other words, arranged by means of a shaft in the base member 302 spaced at least radially to the latter.

The axial spacing of the cross section adjustment member 303 to the base member 302 can be formed, for example, by the shaft shoulder 319 on the shaft section 312 and/or by stops 320, 321 of the base member 302.

Figure 13:
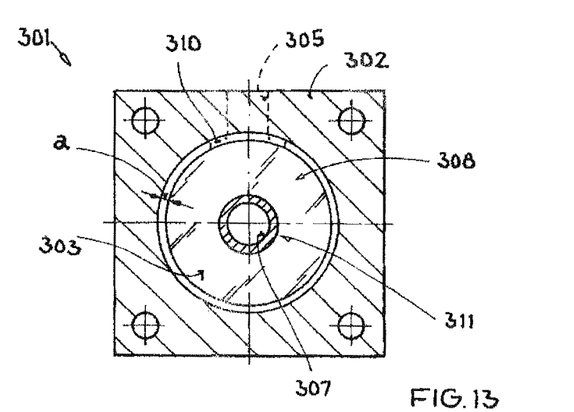
FIG. 13 shows the rotary slide valve from FIG. 12 in a top view.

FIG. 13 shows the rotary slide valve 310 in a top view of the face side 308 of the cross section adjustment member 303 according to section A-A from FIG. 12. In this connection, the peripheral distance a between the cross section adjustment member 303 and the base member 302 can be clearly ascertained.

The support or arrangement of the cross section adjustment member 303 in the base member 302 which is described in FIGS. 12 and 13 can of course also be applied accordingly to the rotary slide valve shown in FIGS. 1 to 11.

The invention claimed is:
1. A rotary slide valve assembly comprising:
a housing;
a first valve mounted in said housing, rotatable about an axis and having an axially disposed opening and a radially disposed opening communicable with a first port in said housing;
a second valve mounted in said housing, rotatable about said axis and having a first axially disposed opening fluidly communicating with said axially disposed opening of said first valve, a second axially disposed opening fluidly communicable with a fluid pump and at least one radially disposed opening fluidly communicable with a second port of said housing; and a gear set axially disposed in at least one of said intercommunicating axial openings of said valves, drivingly interconnecting said valves and having a gear ratio other than 1:1.

2. The assembly of claim 1 including a motor for selectively drivingly operating said gear set to rotate said valves.

3. The assembly of claim 1 including seals disposed between each of said valves and said housing.

4. The assembly of claim 1 wherein said second valve is provided with three radially disposed openings each communicable with a port of said housing, spaced circumferentially relative to said axis.

5. The assembly of claim 1 wherein said gear set has a step down gear ratio of 2:1.

6. The assembly of claim 1 wherein said gear set comprises one of a planetary, spur and bevel gear set.

7. The assembly of claim 1 wherein said gear set comprises a planetary gear set including a sun gear connected to one of said valves, a ring gear axially connected to the other of said valves and a set of planetary gears each drivingly interconnecting said sun and ring gears.

8. An assembly according to claim 1 wherein said valves are spherically configured.

9. The assembly of claim 1 wherein said gear set includes a set of circumferentially spaced, longitudinally disposed projections provided on one of said valves, radially displaced relative to said axis, a set of circumferentially spaced, longitudinally disposed projections provided on the other of said valves, radially displaced relative to said axis, a gear having an axis disposed parallel and radially displaced relative to said valve axis, having teeth engaging in driving relation with said projections.

10. An assembly according to claim 9 wherein sets of said projections are longitudinally alignable.

11. An assembly according to claim 9 wherein every other one of the set of teeth of said gear is provided with reduced longitudinal portions resulting in a lesser number of teeth portions of said gear engaging the projections of said adjacent one of said valves.

* * * * *